Dec. 5, 1944.  M. J. SCHLITTERS  2,364,320
SHAVING TOOL
Filed Aug. 17, 1942  2 Sheets-Sheet 1
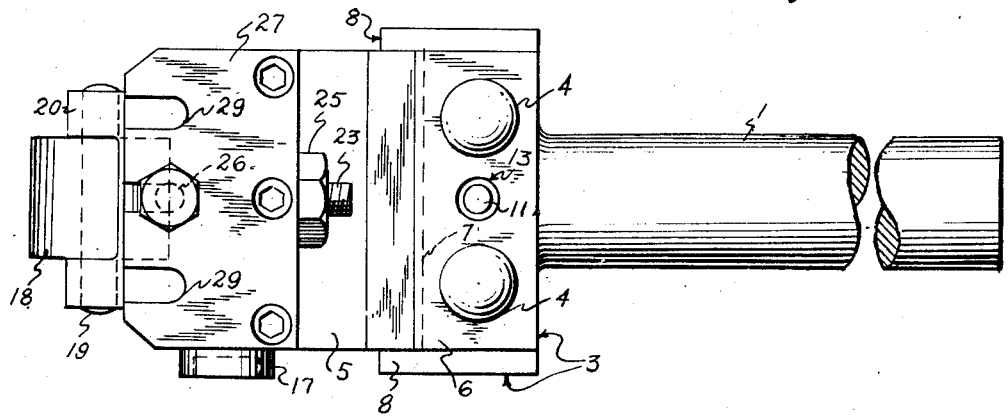
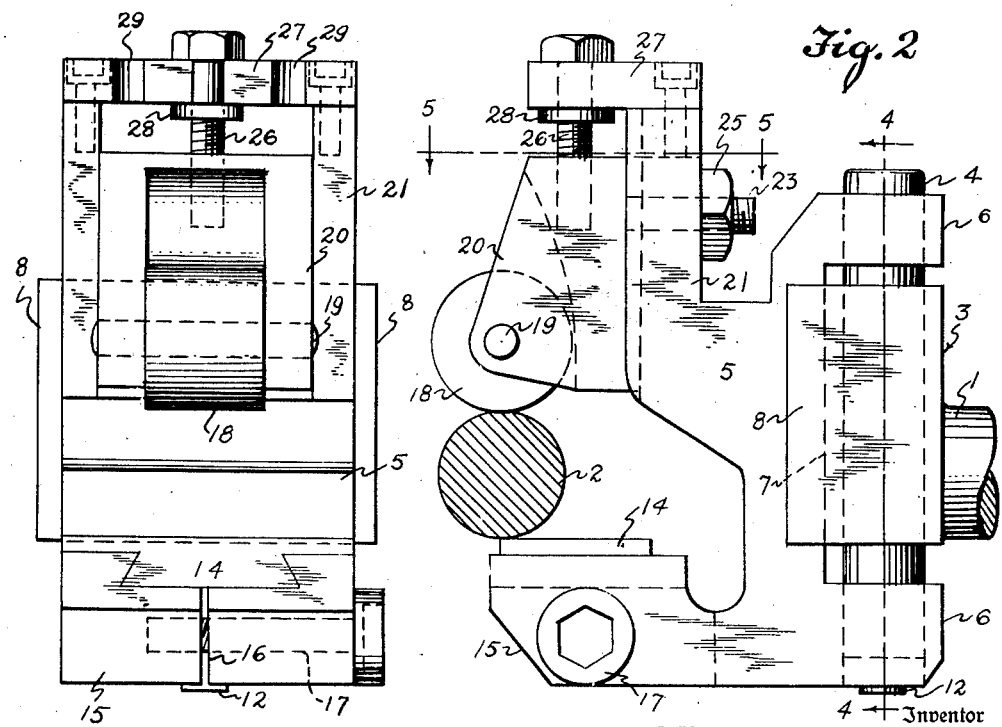
Inventor
Michael J. Schlitters
By J. S. Murray
Attorney Dec. 5, 1944. M. J. SCHLITTERS 2,364,320
SHAVING TOOL
Filed Aug. 17, 1942 2 Sheets-Sheet 2

Inventor
Michael J. Schlitters

J. D. Murray
Attorney

Patented Dec. 5, 1944

2,364,320

UNITED STATES PATENT OFFICE 2,364,320

SHAVING TOOL

Michael J. Schlitters, East Detroit, Mich.

Application August 17, 1942, Serial No. 455,088

7 Claims. (Cl. 82—35)

This invention relates to tool holders and particularly tool holders for use on automatic screw machines and the like.

It is common in operation of automatic screw machines to provide a self-adjusting holder for a finishing or shaving tool, permitting the same predetermined cut to be taken on different bars of stock presented to such tool by the several spindles of the machine, even when positioning of said bars varies slightly due to imperfections in indexing mechanism of the machine. A common way of affording self adjustment of the cutter is to mount a roller on the tool holder in such spaced relation to the cutting edge that a diametrically opposed engagement of the roller and cutter with the work will assure a proper cut, the tool holder having a sufficient spring-resisted floating movement to permit its deflection to the proper position as the roller encounters the work upon advance of the tool holder to cutting position.

An object of the present invention is to guide a tool holder of the described type in its floating travel with materially greater accuracy and less danger of breakage than heretofore.

Another object is to simplify and improve the provision for applying spring resistance to floating travel of the holder and for regulating extent of such travel.

A further object is to provide an improved means for adjusting the roller to adapt it to different thicknesses of work, and for maintaining it more securely adjusted than in prior practice.

These and various other objects are attained by the construction hereinafter described and illustrated in the accompanying drawings, wherein:

Fig. 1 is a top plan view of the improved tool holder.

Fig. 2 is side elevational view showing the cutter operating on a piece of work.

Fig. 3 is a front view of the same.

Figure 4:
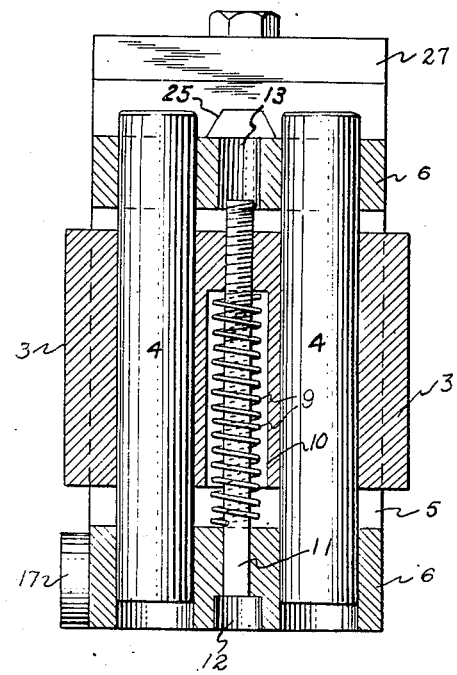
Fig. 4 is a vertical sectional view taken upon the line 4—4 of Fig. 2.
Figure 6:
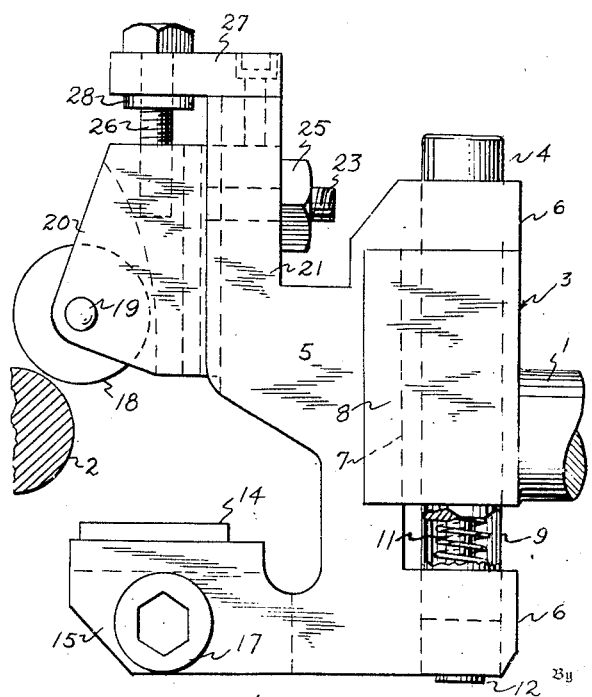
Fig. 6 is a side elevational view showing position of the parts prior to engagement of the roller with the work.

In these views, the reference character 1 designates the usual tool holder shank suited to be secured in the socket of a carriage or slide (not shown) which may be automatically advanced at proper intervals toward the work 2. The latter is represented as a rod, it being understood that several of such rods are carried by rotating spindles, journaled in a suitable turret to be advanced step by step through a predetermined number of stations or working positions. The shank 1, at its front end, integrally carries a rectangular head 3 wherein two spaced parallel pins 4 are press-fitted or otherwise rigidly mounted, said pins being transverse to the shank and to the axis of rotation of the work. The end portions of said pins project from the head 3 and serve as slide guides for a tool holder 5 by engaging upper and lower lugs 6 integrally and rearwardly projecting from the tool holder. To further assure accurate guidance of the tool holder and overcome any stresses opposing such guidance, the tool holder and head have extensive coacting guide faces 7 transverse to the shank 1 and the head 3 is formed with a pair of forwardly projecting flanges 8 engaging the side faces of the tool holder.

Between the pins 4 a coiled spring 9 having its major portion disposed in a socket 10 of the head 3 reacts between said head and the lower lug 6 to yieldably resist upward sliding of the tool holder. Response of the tool holder to said spring is regulated by an adjusting screw 11 which extends rotatively through the lower lug 6 and has a head 12 socketed in and affording a seat to said lug, said screw extending freely through the spring 9 and being threaded in the portion of the head 3 overlying said spring. Preferably an opening 13 in the upper lug 6 freely accommodates the upper end portion of said screw.

A finishing or shaving cutter 14 is rigidly carried by a mounting 15 therefor projecting forwardly at the lower end of the tool holder. While various provisions may be made for detachably holding the cutter on its mounting, the illustrated mounting is slotted at 16 and the slightly flexible jaws thus formed are clamped upon the cutter by a screw 17.

Figure 5:
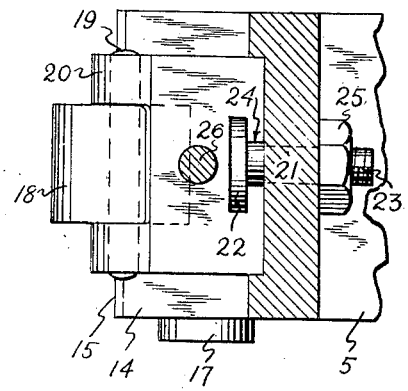
Fig. 5 is a cross sectional view taken on the line 5—5 of Fig. 2, and particularly showing how the roller holder is mounted.

Directly above the cutting edge of the cutter a roller 18 is journaled on a shaft 19 fixed in a holder 20 which is adjustable to and from the cutter along an arm 21 upstanding from the tool holder. The roller holder is guided in such adjustment by a tongue and groove engagement with the arm 21, best shown in Fig. 5 and for clamping the roller holder tightly to said arm, the head 22 of a clamping bolt 23 is engaged in a T-groove 24 extending in the roller holder in the direction of its adjustment, said bolt passing freely through said arm and receiving a nut 25 for clamping against the rear face of said arm. To assure a high degree of accuracy in adjusting the roller holder and to supplement the clamping provision 22, 23, 24, 25 in resisting upwardly acting stresses, a screw 26 rotative in a plate 27 rigidly surmounting and forwardly projecting from the arm 21 is tapped into the roller holder, said screw being headed above the plate 27 and rigidly carrying a collar 28 below the plate, whereby any lengthwise travel of such screw is prevented. Preferably the plate 27 has a number of spaced U slots 29 extending from its front edge to selectively receive the screw 26 according to the location of the roller. Thus if the nature of the work requires a roller located to one side or the other of the central position illustrated, the screw 26 may be shifted accordingly. While different roller holders will be used to suit the roller to different types of work the T-groove 24 may be so located in any roller holder as to receive the head of the bolt 23.

In setting up a screw machine for use of the described tool holder, a roller holder suited to the particular job is first adjusted to so space it from the cutting edge that a desired shaving or finishing cut will be taken when the work lies between the roller and said edge. The screw 11 is then adjusted to afford such up-and-down floating travel of the tool holder as will compensate for inaccurate indexing. For example, if ⅛ inch play of the tool holder is desired, the screw is adjusted to afford ⅛ inch clearance between the head 3 and lower lug 6. Thus when roller encounters the work, the resultant lifting of the tool holder may be ⅛ inch or any lesser distance.

A primary advantage of the described construction is its complete accuracy, and high resistance to wear and working stresses. The pins 4 in themselves strongly assure perfect guidance of the tool holder in its floating travel and such guidance is further assured by the engaging faces 7 and flanges 8. Proper position of the roller 18 is also very positively maintained by described construction, and working stresses applied to the holder 20 from the roller are strongly resisted. Leverage under which such stresses act is reduced as far as possible by minimizing distance from the roller to the arm 21 on which roller holder is installed, and provision of a minimum distance from the tool holder guides to the roller and cutter also reduces stress leverage.

The adjustments for both the roller holder and tool holder may be easily and quickly effected with a high degree of accuracy and machining and assembly of the parts is of a simple nature minimizing production costs.

What I claim is:

1. In a screw machine tool, a holder, a cutter mounted on the holder to take effect on rotating work, a roller mounted on the holder in spaced relation to the cutter and engageable with the work to float the holder to its position giving the cutter proper effect, a head for actuating the holder to and from the work, a plurality of pins extending through the head and engaged at both ends thereof with the holder to accurately guide its floating travel, said pins being elongated in the direction of spacing of the cutter and roller and being spaced apart transversely to travel of the head, and a spring reacting between the head and holder to yieldably resist floating travel of the holder, the head having substantially transverse faces parallel to floating travel of the holder and the holder having faces engaging said transverse faces of the head to supplement said pins in guiding the holder in floating travel.

2. In a screw machine tool, a holder forwardly movable to its working position and having a pair of rearwardly projecting lugs, a cutter mounted on the holder to take effect on rotating work, a roller mounted on the holder in spaced relation to the cutter and engageable with the work to float the holder to its position giving the cutter proper effect, a head for actuating the holder forwardly and back having its major portion disposed between said lugs, a plurality of pins extending through the head and engaging said lugs to mount the holder on the head and guide the holder in its floating travel, said pins being elongated in the direction of spacing of the cutter and roller and being spaced apart transversely to travel of the head, and a spring reacting between the head and holder to yieldably resist floating travel of the holder.

3. In a screw machine tool, a holder, a cutter mounted on the holder to take effect on rotating work, a roller mounted on the holder in spaced relation to the cutter and engageable with the work to float the holder to its position giving the cutter proper effect, a head for actuating the holder to and from the work, a plurality of pins extending through the head and engaged at both ends thereof with the holder to accurately guide its floating travel, said pins being elongated in the direction of spacing of the cutter and roller and being spaced apart transversely to travel of the head, a screw reacting between the head and holder and regulating the amount of floating travel of the holder, and a spring reacting between the head and holder to yieldably resist floating travel of the holder, said spring being coiled around the screw and having its major portion recessed in the head.

4. In a screw machine tool as set forth in claim 2, a screw reacting between the head and holder and regulating the amount of floating travel of the holder, said spring being coiled around the screw and having its major portion recessed in the head.

5. In a screw machine tool, a holder, a cutter mounted on the holder to take effect on rotating work, a roller mounted on the holder in spaced relation to the cutter and engageable with the work to float the holder to its position giving the cutter proper effect, a head for actuating the holder to and from the work, means mounting the holder on the head and affording the holder a rectilinear floating travel transverse to travel of the head, a pair of lugs on the holder between which lugs the head is disposed, said lugs limiting said floating travel, a coiled spring socketed in the head and reacting between the head and one of said lugs to resist said floating travel, and a screw extending through said spring and having threaded engagement with the head and having an abutment seating against the lug abutted by the spring to regulate response of the holder to the spring.

6. In a screw machine tool, a holder, a cutter mounted on the holder to take effect on rotating work, a roller mounted on the holder in spaced relation to the cutter and engageable with the work to float the holder to its position giving the cutter proper effect, a head for actuating the holder to and from the work, a plurality of pins fixed in said head and having their end portions projecting from the head, means slidably mounting the holder on the end portions of said pins to guide the holder in its floating travel, a spring reacting between the head and holder to yieldably resist floating travel of the holder, and a screw reacting between the head and holder and regulating the amount of floating travel.

7. A screw machine tool as set forth in claim 6, two of said guide pins being provided and at least one of the elements reacting between the head and holder being disposed between said pins.

MICHAEL J. SCHLITTERS.